United States Patent [19]

Uhlmann

[11] 4,267,051

[45] May 12, 1981

[54] METHOD AND APPARATUS FOR AERATING WATER

[75] Inventor: Georg Uhlmann, Koblenz, Fed. Rep. of Germany

[73] Assignee: Rheintechnik Weiland & Kaspar KG, Neunkirchen, Fed. Rep. of Germany

[21] Appl. No.: 53,246

[22] Filed: Jun. 29, 1979

[30] Foreign Application Priority Data

Jul. 1, 1978 [DE] Fed. Rep. of Germany ....... 2829006

[51] Int. Cl.³ ............................ C02F 3/04; C02F 3/18
[52] U.S. Cl. .................................. 210/619; 210/150; 261/92
[58] Field of Search ................... 210/17, 150, 15, 151, 210/14, 63 R; 261/92, 93

[56] References Cited

U.S. PATENT DOCUMENTS

| 3,613,890 | 10/1971 | Hellqvist | 210/150 |
|---|---|---|---|
| 3,744,774 | 7/1972 | Huisman et al. | 261/92 |
| 4,137,172 | 1/1979 | Sako et al. | 210/150 |
| 4,160,736 | 7/1979 | Prosser | 261/92 |

FOREIGN PATENT DOCUMENTS

| 2849013 | 5/1979 | Fed. Rep. of Germany | 210/150 |
|---|---|---|---|
| 2240190 | 3/1975 | France | 210/150 |
| 2259792 | 8/1975 | France | 210/151 |
| 537340 | 7/1973 | Switzerland | 210/150 |
| 579227 | 11/1977 | U.S.S.R. | 210/150 |

*Primary Examiner*—Benoit Castel
*Attorney, Agent, or Firm*—Max Fogiel

[57] ABSTRACT

An improvement for the aeration of the water and combining the aeration with the cleansing of the water by a biological cover, in which one or several circular disks rotate in a clarifying reservoir about a horizontal shaft. These carry at their circumference annularly bent funnels which extend in part above the water surface and continuously converge in direction from the inlet opening to the outlet opening. Above the water surface air enters through the inlet opening into the funnel and below the water surface water enters into it. Because the funnel converges continuously, both water and air are accelerated and compressed in the funnel. The compression assures that the amount of oxygen which is soluble in the water and can be accepted by the same from the air, is substantially increased. The biological cover forms on the disks and on the outer surface of the funnel.

10 Claims, 4 Drawing Figures

METHOD AND APPARATUS FOR AERATING WATER

BACKGROUND OF THE INVENTION

The present invention relates to a method for aerating of water and an apparatus for carrying out this method.

For aerating of water, e.g. in order to improve living conditions of plants and animals living in water, it is known to arrange below the surface of the water aperture tubes and to admit air into the water through these. The air escaping through the holes in the aperture tubes bubbles up in the water. During this, the water partially accepts oxygen from the air. This oxygen is then additionally available to the plants and animals. However, this method is very expensive because a requisite number of aperture tubes must be installed beneath the surface of the water and compressors are required which press the air into the tubes. These compressors must be appropriately dimensioned because only a part of the oxygen contained in the air is received in the water so that corresponding quantities of air must be admitted into the water. For the aeration of water it is further known to use rotating hollow bodies which traverse a part of their path above and a part of their path below the surface of the water, and which have cutouts only in that part of their walls which is uppermost at the emerging side. The bodies are filled with solid materials having a large surface accessible to air and water. At the emerging side these hollow bodies carry water with them above the surface of the water, which slowly runs back to the water surface during the travel of the hollow bodies above the water surface. At the immersion side the wall portion having the cutouts is located lowermost so that at the immersing side the hollow bodies carry air with them beneath the water surface, which air gradually bubbles out of the hollow bodies during the travel of the hollow bodies beneath the water surface and rises in the water. The oxygen contained in the bubbling air is partially absorbed in the water and converts the deleterious substances contained in the water into harmless substances, insofar as this is possible by action of the oxygen. Such a device also is very costly, because the hollow bodies must be so constructed that at the emerging side they can carry water with them above the water surface and at the immersion side they can carry air with them beneath the water surface. Also, the number of hollow bodies must be correspondingly large because the oxygen is only gradually absorbed by the water, so that a correspondingly large quantity of air must be imported beneath the water surface.

SUMMARY OF THE INVENTION

It is the purpose of the present invention to provide a method which makes it possible to increase the quantity of oxygen dissolved in the water without at the same time having to increase the amount of air which is introduced into the water.

This object is met essentially in that water and air are alternately pushed through a passage which continuously converges from the inlet opening to the outlet opening, and that the air leaves the passage through the outlet opening beneath the water surface and whereas the water leaves the passage through the outlet opening at least in part above the water surface.

Both the water and the air are accelerated and compressed in the passage which continuously converges from the inlet opening to the outlet opening. The compression results in a substantial increase of the quantity of oxygen which can be dissolved by the water and accepted out of the air. Since the air leaves the passage below the water surface and the water leaves it at least in part above the water surface, a good agitation of the water is furthermore obtained. Because the air leaves the passage through the outlet opening only beneath the surface of the water and then rises in the water, and because the water is at least in part discharged from the outlet opening of the passage only above the surface of the water, the water can additionally accept oxygen from the air.

An arrangement having an annularly bent funnel which continuously converges from the inlet opening to the outlet opening, travels about a horizontal axis and extending away part of its height above the water surface, is particularly suitable for carrying out the invention.

The funnel rotates with its inlet opening directed forwardly. When the inlet opening is beneath the water surface, the water enters into the same, and since the funnel continuously converges towards the outlet opening, so that the same quantity of water must flow through a constantly decreasing cross-section, the water will be substantially accelerated and thereby compressed. The acceleration causes the water to be discharged at least in part from the outlet opening when the same is located above the water surface during the rotation of the funnel. The accelerated and compressed water issuing from the outlet opening drops back to the water surface, and during this path above the water surface accepts oxygen from the air and carries air with it below the water surface, from which air the water can then accept oxygen. When the inlet opening of the rotating funnel reaches the surface of the water at the opposite side, air enters into the funnel. During the path of the inlet opening of the funnel from that side at which it exits from the water to the side at which it enters into the water, the portion of the funnel located above the water surface fills with air. After entry of the inlet opening into the water surface water again flows into the funnel and, due to the constantly converging cross-section becomes accelerated and compressed in the funnel, whereby at the same time the air contained in the funnel becomes compressed and is accelerated and advanced in the direction towards the outlet opening. Thus, the air leaves the outlet opening of the funnel not only when the outlet opening is located above the water surface but already issues from the outlet opening far below the water surface and then rises in the water. Due to the compression of the air and the water in the funnel the quantity of air oxygen which can be accepted by the water is substantially increased. A further increase of the quantity of air oxygen accepted by the water is achieved in that, based upon the acceleration of the air and the water in the funnel, the air leaves the funnel already far below the water surface and rises in the water, i.e. is able to yield oxygen to the water.

The outer circumference of the funnel is advantageously annular and the inner circumference of spiral shape. Outlet opening and inlet opening of the funnel are advantageously spaced at a small distance from one another. The cross-sectional surface area of the outlet opening should be substantially smaller than the cross-sectional surface area of the inlet opening and advantageously should not be greater than one tenth thereof, in order to obtain in the funnel a sufficiently high acceleration and compressed compression of the water into the air. The annularly bent funnel extends advantageously to between one half and one third of its height from the water surface. Convergence of the funnel from the inlet end to the outlet end should be continuous. The circumferential speed of the funnel should be adjustable in order to accommodate it to the particular requirements. Deleterious substances contained in waters, particularly in waste waters, frequently cannot be converted into harmless substances by the oxygen of the air alone. These deleterious substances which cannot be converted by the air oxygen alone, usually are nitrogen compounds. To convert such substances it is known to treat waste water with micro-organisms, e.g. in form of living sludge or a biological cover. These micro-organisms convert the nitrogen-containing deleterious substances into nitrites and nitrates which, at least in low concentrations, are harmless for animal and plant life in water. It is known to use disks which rotate about a horizontal axis and which project with a portion of their diameter, e.g. with half, above the water surface and on which, even without innoculation of the water, a biological coating forms in relatively brief time which is composed of micro-organisms that convert the deleterious nitrogen compounds contained in the water into nitrites and nitrates.

A further object of the invention is to combine the clarification of waters, particularly waste waters, by aeration and the use of biological coatings.

This object is met essentially in the use of a driven, preferably circular disk which rotates about a horizontal axis and carries at its circumference the funnel.

On the rotating disk the biological coating will form after a relatively short time, which is composed of micro-organisms that convert the deleterious substances contained in the water, particularly nitrogen-containing substances.

For the clarification of waste water several disks provided at their circumference with funnels, are arranged at small spacing from one another, preferably one behind the other and advantageously axially relative to one another in a reservoir. The inlet openings and also the outlet openings should be offset from disk to disk, preferably by 45°. The reservoir should preferably be so constructed that the roller composed of the individual disks extends beneath the water surface as close as possible to the wall of the reservoir. Between the disks a sufficient spacing must remain, to assure that the water extends up to the surface even between the disks so that a biological coating forms on the disks and a sufficient mixing of the water occurs even between the disks, so as to obtain an intensive contacting of the biological coating on the disks and the water.

Other characteristics of the invention are set forth in the description, the figures and in the subclaims, and it is noted that all individual characteristics and all combinations of individual characteristics are of importance for the invention.

BRIEF DESCRIPTION OF THE DRAWINGS

In the FIGS. 1-4 the invention is illustrated by way of examples in exemplary embodiments, but without being limited to these embodiments.

DESCRIPTION OF THE PREFERRED EMBODIMENTS

Figure 1:
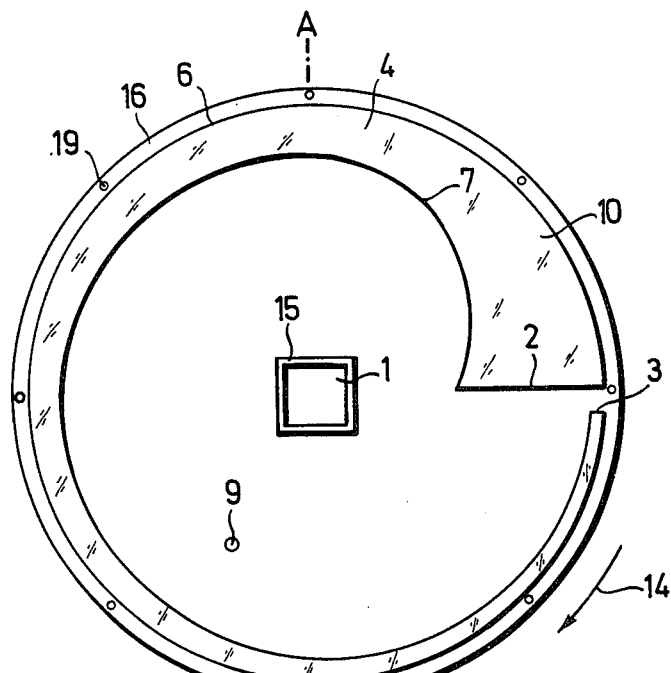
FIG. 1 is a top plan view of a disk provided at its circumference with a funnel.
Figures 2, 3:
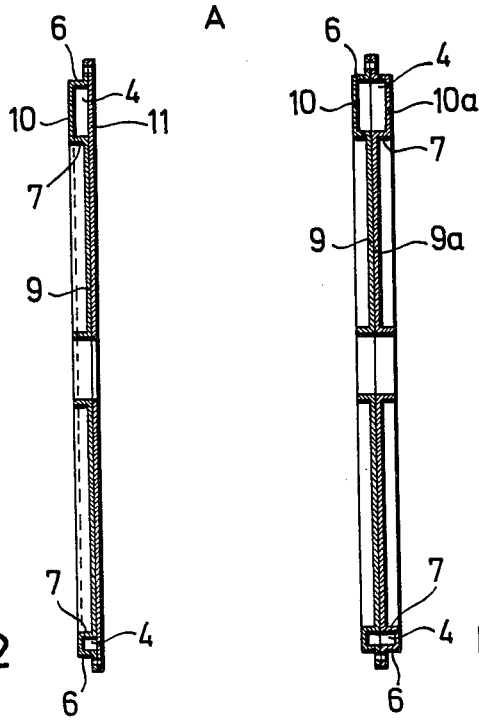
FIG. 2 is a vertical section through a disk taken on line A—A of FIG. 1, in which the funnel is closed by a plate.
FIG. 3 is a vertical section through a disk body of two identical but opposite plates.
Figure 4:
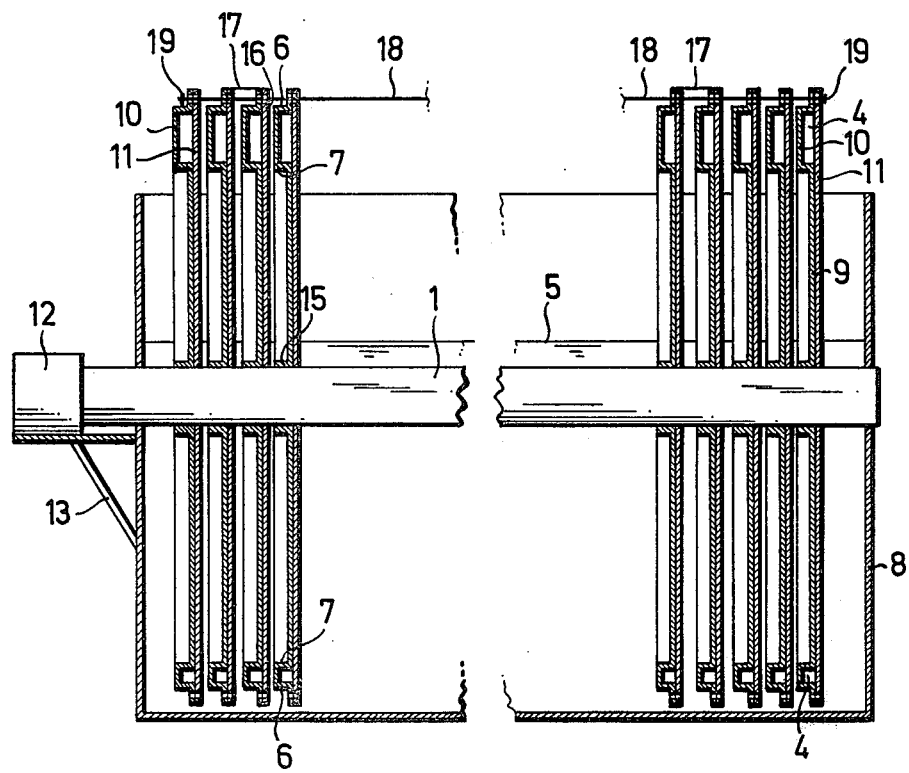
FIG. 4 is a vertical section of an aeration reservoir.

Mounted in the head walls of the aeration reservoir 8, beneath the water surface 5, is the shaft 1. The shaft 1 is driven by the drive 12 which is arranged outside the reservoir 8 on a console 13 and connected with the shaft 1 in known manner. Arranged in the shaft 1 within the reservoir 8, at small spacing from one another, are the disks 9. The cross-section of the shaft 1 within the reservoir 8 is preferably polygonal, particularly aquatic. This assures in a simple manner that the disks 9 cannot rotate on the shaft 1. The disks 9 are advantageously circular. At the outer circumference all of disks 9 are provided with identically directed bulges 10. At the sides of the disks 9 facing away from the bulge 10 these bulges 10 are closed by means of the plate 11. The plates 11 are also advantageously circular of configuration. The hollows formed by the bulges 10 and 11 are of funnel-shaped configuration. In FIG. 1 the direction of rotation is indicated by the arrow 14. From the inlet opening 2 of the funnel 4 formed by the hollow space to the outlet opening 3 the cross-sectional area of the funnel 4 decreases continuously. The cross-sectional surface area of the inlet opening 2 should be substantially greater than the cross-sectional surface area of the outlet opening 3. It is advantageous if the cross-sectional surface area of the outlet opening 3 is not more than one tenth of the cross-sectional surface area of the inlet opening 2. The outer circumference 6 of the funnel 14 is advantageously circular whereas the inner circumference 7 is advantageously of spiral configuration. The inlet opening 2 and the outlet opening 3 are located at a small distance from one another. The disks 9 shall extend to approximately one half to one third from the water surface 5. The disks 9 are produced of a formable material such as metal or particularly a synthetic plastic. The plates 11 may be made of the same material. At the shaft 1 the disks 9 are provided with short sockets 15 which are located at the shaft 11 and serve to prevent a tilting of the disks 9. The length of these sockets 15 corresponds approximately to the height of the narrow bulges 10. Outside of the funnel 4 the disks 9 are further provided with an annulus 16. Between two disks 9 spacer members 17 are arranged between the two annuli 16 in order to assure the necessary spacing of the disks 9 from one another, particularly in the region of the funnels 4. Long bolts 18 extend through the annuli 16 and the spacer members 17, and hold together the packet composed of the individual disks 9. Nuts 19 are threaded onto the ends of the long bolts 18. The inlet openings 2 and therefore the outlet openings 3 of the funnels 4 on the disks 9 are preferably offset relative to one another from disk 9 to disk 9, preferably by about 45°. The disks 9 rotate in the direction of the arrow 14. When the inlet opening 2 enters into the water surface 5, the water enters into the funnel 4. Because of the constantly converging cross-section of the funnel 4, the water is accelerated and compressed in the funnel 4. This assures that the water leaves the outlet opening 3 of the funnel 4 not only beneath the water surface 5, but leaves it at least in part only when the outlet opening 3 of the funnel 4 is located above the water surface 5. When the inlet opening 2 of the funnel 4, during the rotation thereof, reaches the water surface at the side of the axis which is located opposite the inlet side, then air enters into the funnel 4 until the inlet opening 2 of the funnel 4 again dips into the water surface. If the inlet opening 2 of the funnel 4 has again dipped into the water surface 5, the now entering water compresses the air and accelerates it in a direction towards the outlet opening 3. The compression assures that the water can take oxygen from the air in a substantially greater amount than if the air were not compact compressed. The acceleration of the air in the funnel 4 assures that the air leaves the outlet opening 3 not only after the outlet opening 3 is located above the water surface 5, but already at a time when the outlet opening 3 is still located beneath the water surface 5. The air exiting from the outlet opening 3 of the funnel 4 beneath the water surface 5 then rises in the water whereby the water can receive oxygen from the air. Of course, that water which during the passage of the outlet opening 3 above the water surface 5 leaves the outlet opening 3, also receives oxygen from the air and carries air with it beneath the water surface 5 when it drops onto the same. In the embodiment according to FIG. 3 two oppositely symmetrically constructed disks 9 and 9a are provided with bulges 10 and 10a which together form the funnel 4, and are united to form a disk body.

To prevent the deposition of sediments and floating substances contained in the water on the spacer members 17, it is advantageous to so construct the sockets 15 that the distance between the bulge 10 and the plate 11 between two adjacent disks 9 is sufficiently large, to be able to omit the spacer members 17, and to extend the long bolts 18 through the disks 9 in the immediate vicinity of the shaft 1 respectively of the sockets 15.

I claim:

1. A method for the aeration and biological cleansing of water comprising the steps of: pushing water and air through a passage continuously converging from an inlet opening to an outlet opening; said passage being located on a rotating circular disk and comprising an annularly bent funnel thereon, said funnel extending in part above the water surface and continuously converging in direction from said inlet opening to said outlet opening; receiving said water and said air in said passage in alternation; directing said air to leave said passage through said outlet opening beneath water surface and to rise in the water; and directing said water to leave said passage through said outlet opening at least in part above said water surface for accepting oxygen from the air, said passage having a continuously reducing cross-section, whereby the water becomes accelerated and thereby compressed due to the reduction in cross-sectional area; rotating said funnel about a horizontal shaft, the outer circumference of said funnel being substantially circular-shaped and the inner circumference of said funnel is substantially spiral-shaped; arranging said outlet opening and said inlet opening of said funnel at a substantially small distance from one another, said disk being rotatably mounted on said horizontal shaft; driving said disk on said horizontal shaft in a reservoir containing said water, said funnel being mounted on said disk at its circumference whereby a biological cover useful for cleansing the water forms on the disk and on the outer surface of the funnel.

2. Apparatus for the aeration and biological cleansing of water, having a water surface comprising: an annularly bent funnel rotating about a horizontal shaft and continuously converging from an inlet opening to an outlet opening extending in part above the water surface, the outer circumference of said funnel being substantially circular-shaped and the inner circumference of said funnel being substantially spiral-shaped, said outlet opening and said inlet opening of said funnel being arranged at a substantially small distance from one another, a horizontal shaft, a reservoir, a driven disk rotatably mounted on said horizontal shaft in said reservoir; said funnel being mounted on said driven disk at its circumference whereby a biological cover useful for cleansing the water forms on the disk and on the outer surface of the funnel.

3. Apparatus as defined in claim 2, wherein said funnel extends about one half up to one third of its height above the water surface.

4. Apparatus as defined in claim 2, wherein the cross-sectional surface area of said outlet opening is substantially smaller than the cross-sectional surface area of said inlet opening and not exceeding one tenth thereof.

5. Apparatus as defined in claim 2, wherein said disk is of formable material, such as metal or particularly synthetic plastic; said disk having a bulge at its circumference for the formation of said funnel; said bulge extending to one side and continuously converging from said inlet end to said outlet end; said bulge being closed by a plate at its other side.

6. Apparatus as defined in claim 5, further comprising two circular plates of formable material such as metal or particularly synthetic plastic; said plates having oppositely directed bulges at their circumference for the formation of said funnel; said bulges converging continuously from the inlet end to the outlet end; said plates being connected with one another at their surfaces facing away from said bulges.

7. Apparatus as defined in claim 1, wherein a plurality of disks having funnels at their circumferences are rotatably mounted on said horizontal shaft; said disks being arranged with spacing from one another and axially relative to one another in the reservoir.

8. Apparatus as defined in claim 7, wherein said inlet and outlet openings are offset relative to one another from disk to disk.

9. Apparatus as defined in claim 8 wherein said inlet and outlet openings are offset relative to one another by 45° from disk to disk.

10. Apparatus for aeration and biological cleansing of water having a water surface comprising: passage means continuously converging from from an inlet opening to an outlet opening for passing water and air alternatingly therethrough; a rotating circular disk, said passage means being located on said rotating circular disk and comprising an annularly bent funnel, said funnel extending in part above the water surface and continuously converging in direction from said inlet opening to said outlet opening for accelerating and thereby compressing the water due to reduction in cross-sectional area from said inlet opening to said outlet opening, said water and said air being received in said passage means in alternation, said air leaving said passage means through said outlet opening beneath the water surface and rising in the water, said water leaving said passage means through said outlet opening at least in part above said water surface for accepting oxygen from the air; a horizontal shaft for rotatably mounting said disk; the outer circumference of said funnel being substantially circular-shaped and the inner circumference of said funnel is substantially spiral-shaped; said outlet opening and said inlet opening of said funnel being arranged at a substantially small distance from one another; a reservoir; said driven disk being rotatably mounted on said horizontal shaft in said reservoir; said funnel being mounted on said driven disk at its circumference whereby a biological cover useful for cleansing the water forms on the disk and on the outer surface of the funnel.

* * * * *